(12) United States Patent
Lovett et al.

(10) Patent No.: US 9,759,424 B2
(45) Date of Patent: Sep. 12, 2017

(54) SYSTEMS AND METHODS INVOLVING REDUCED THERMO-ACOUSTIC COUPLING OF GAS TURBINE ENGINE AUGMENTORS

(75) Inventors: Jeffery A. Lovett, Tolland, CT (US); Derk S. Philippona, Tolland, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 2078 days.

(21) Appl. No.: 12/260,436

(22) Filed: Oct. 29, 2008

(65) Prior Publication Data

US 2010/0101208 A1 Apr. 29, 2010

(51) Int. Cl.
*F23R 3/20* (2006.01)
*F02K 3/10* (2006.01)

(52) U.S. Cl.
CPC .............. *F23R 3/20* (2013.01); *F02K 3/10* (2013.01); *F05D 2260/96* (2013.01); *F05D 2270/14* (2013.01); *F23R 2900/00013* (2013.01)

(58) Field of Classification Search
CPC .. F23R 2900/00013; F23R 2900/00014; F05D 2260/96; F05D 2260/962; F05D 2260/964
USPC .................... 60/761–766, 772, 725
See application file for complete search history.

(56) References Cited

U.S. PATENT DOCUMENTS

| | | | | |
|---|---|---|---|---|
| 1,114,823 A | * | 10/1914 | Turner | 303/15 |
| 3,176,465 A | * | 4/1965 | Colley, Jr. | 60/749 |
| 3,210,928 A | * | 10/1965 | Zelinski | 60/736 |
| 3,866,108 A | * | 2/1975 | Yannone et al. | 322/14 |
| 3,866,109 A | * | 2/1975 | Reed et al. | 322/15 |
| 3,875,380 A | * | 4/1975 | Rankin | 700/69 |
| 3,891,915 A | * | 6/1975 | Yannone et al. | 322/15 |
| 3,898,842 A | * | 8/1975 | Luongo | 60/653 |
| 3,913,314 A | * | 10/1975 | Yannone et al. | 60/790 |
| 3,919,623 A | * | 11/1975 | Reuther | 322/15 |
| 3,965,674 A | * | 6/1976 | Hobbs et al. | 60/39.182 |
| 3,974,643 A | * | 8/1976 | Smith et al. | 60/39.182 |
| 4,003,201 A | * | 1/1977 | Lewis et al. | 60/262 |
| 4,016,717 A | * | 4/1977 | Smith et al. | 60/39.182 |
| 4,257,224 A | * | 3/1981 | Wygnanski et al. | 60/204 |
| 4,366,835 A | * | 1/1983 | Akagi et al. | 137/495 |
| 4,409,787 A | * | 10/1983 | Davi et al. | 60/39.77 |
| 4,703,737 A | * | 11/1987 | Cook et al. | 123/520 |
| 4,989,407 A | * | 2/1991 | Grant, Jr. | 60/762 |

(Continued)

OTHER PUBLICATIONS

Houshang B. Ebrahimi, "Overview of Gas Turbine Augmentor Design, Operation, and Combustion Oscillation", May 2006, ILASS Americas, Conference on Liquid Atomization and Spray Systems, p. 2.*

*Primary Examiner* — Pascal M Bui Pho
*Assistant Examiner* — Marc Amar
(74) *Attorney, Agent, or Firm* — Carlson, Gaskey & Olds, P.C.

(57) ABSTRACT

A method for providing thermo-acoustic coupling of a gas turbine engine augmentor includes determining acoustic resonances and heat release phase relationships associated with the augmentor. A fuel injector of the augmentor is positioned at an axial position relative to a flame holder of the augmentor in response to the determined acoustic resonances and heat release phase relationships associated with the augmentor. Heat release and acoustic pressure oscillation cycles associated with the augmentor are out of phase by at least approximately 100 degrees.

15 Claims, 2 Drawing Sheets

(56) References Cited

U.S. PATENT DOCUMENTS

| | | | |
|---|---|---|---|
| 5,040,560 A * | 8/1991 | Glezer et al. | 137/13 |
| 5,095,696 A * | 3/1992 | Gulati et al. | 60/765 |
| 5,178,116 A * | 1/1993 | Fehrenbach et al. | 123/518 |
| 5,259,188 A * | 11/1993 | Baxter et al. | 60/204 |
| 5,343,697 A | 9/1994 | Johnson et al. | |
| 5,417,056 A | 5/1995 | Johnson et al. | |
| 5,524,593 A * | 6/1996 | Denne et al. | 123/520 |
| 5,544,480 A * | 8/1996 | Edwards | 60/243 |
| 5,685,142 A * | 11/1997 | Brewer et al. | 60/765 |
| 5,791,318 A * | 8/1998 | Schulz et al. | 123/520 |
| 5,943,866 A | 8/1999 | Lovett et al. | |
| 6,164,055 A * | 12/2000 | Lovett et al. | 60/776 |
| 6,379,110 B1 | 4/2002 | McCormick et al. | |
| 6,430,933 B1 | 8/2002 | Keller | |
| 6,464,489 B1 | 10/2002 | Gutmark et al. | |
| 6,522,991 B2 * | 2/2003 | Banaszuk et al. | 702/138 |
| 6,672,066 B2 * | 1/2004 | Wrubel et al. | 60/740 |
| 6,698,206 B2 * | 3/2004 | Scarinci et al. | 60/725 |
| 6,698,209 B1 | 3/2004 | Gutmark et al. | |
| 6,840,046 B2 | 1/2005 | Pascherieit et al. | |
| 6,879,922 B2 | 4/2005 | Hogle et al. | |
| 6,968,694 B2 | 11/2005 | Buey et al. | |
| 7,013,165 B2 * | 3/2006 | Yoon et al. | 455/561 |
| 7,013,635 B2 * | 3/2006 | Cohen et al. | 60/204 |
| 7,043,921 B2 * | 5/2006 | Hadder | 60/772 |
| 7,117,839 B2 * | 10/2006 | Horstin | 123/204 |
| 7,137,255 B2 * | 11/2006 | Schmotolocha et al. | 60/761 |
| 7,194,382 B2 * | 3/2007 | Lieuwen | 702/182 |
| 7,210,467 B2 * | 5/2007 | Kweon et al. | 123/557 |
| 7,232,308 B2 * | 6/2007 | Gutmark et al. | 431/114 |
| 7,251,941 B2 * | 8/2007 | Koshoffer et al. | 60/766 |
| 7,334,413 B2 * | 2/2008 | Myhre | 60/803 |
| 7,437,876 B2 * | 10/2008 | Koshoffer | 60/761 |
| 7,628,062 B2 * | 12/2009 | Healy et al. | 73/114.55 |
| 2006/0000219 A1 * | 1/2006 | Myhre | 60/772 |
| 2006/0016192 A1 * | 1/2006 | Bunel et al. | 60/761 |
| 2006/0137352 A1 * | 6/2006 | Prasad et al. | 60/761 |
| 2006/0246385 A1 * | 11/2006 | Gaur et al. | 431/5 |
| 2007/0006590 A1 * | 1/2007 | Muldoon et al. | 60/761 |
| 2007/0234730 A1 * | 10/2007 | Markham et al. | 60/772 |
| 2007/0245743 A1 * | 10/2007 | Hautman et al. | 60/763 |

* cited by examiner

US 9,759,424 B2

SYSTEMS AND METHODS INVOLVING REDUCED THERMO-ACOUSTIC COUPLING OF GAS TURBINE ENGINE AUGMENTORS

BACKGROUND

Technical Field

The disclosure generally relates to gas turbine engines.

Description of the Related Art

Gas turbine engines, particularly those for military aircraft, oftentimes incorporate augmentors (sometimes referred to as afterburners) for increasing thrust. Unfortunately, some augmentors can exhibit high-frequency, combustion-induced pressure oscillations known as screech or rumble. In particular, screech and rumble are caused by thermo-acoustic coupling, i.e., coupling of the heat release and acoustic pressure oscillation cycles, of an augmentor.

SUMMARY

Systems and methods involving reduced thermo-acoustic coupling of gas turbine engine augmentors are provided. In this regard, an exemplary embodiment of a method for reducing thermo-acoustic coupling of a gas turbine engine augmentor comprises: determining acoustic resonances and heat release phase relationships associated with the augmentor; and determining relative axial positions of a fuel injector and a flame holder of the augmentor that result in reduced thermo-acoustic coupling of the augmentor during operation.

An exemplary embodiment of a gas turbine engine augmentor assembly comprises: fuel injectors operative to inject liquid fuel along a gas path; and flame holders positioned downstream of the fuel injectors and being operative to ignite the fuel dispensed from the fuel injectors; the fuel injectors and the flame holders being positioned such that heat release and acoustic pressure oscillation cycles associated with the augmentor are out of phase by at least approximately 100 degrees and less than approximately 260 degrees.

An exemplary embodiment of a gas turbine engine comprises: a compressor; a combustion section; a turbine operative to extract work from combustion products of the combustion section and to drive the compressor; and an augmentor positioned downstream of the turbine, the augmentor having fuel injectors and flame holders positioned such that heat release and acoustic pressure oscillation cycles associated with the augmentor are out of phase by at least approximately 100 degrees and less than approximately 260 degrees.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale.

Moreover, in the drawings, like reference numerals designate corresponding parts throughout the several views.

DETAILED DESCRIPTION

Systems and methods involving reduced thermo-acoustic coupling of gas turbine engine augmentors are provided, several exemplary embodiments of which will be described in detail. In this regard, embodiments involve positioning of one or more fuel injectors of an augmentor relative to one or more flame holders so that heat release and acoustic pressure oscillation cycles associated with the augmentor are out of phase by at least approximately 100 degrees and less than approximately 260 degrees, e.g., approximately 180 degrees. In some embodiments, this is accomplished by modeling the acoustic response, fuel delivery response and combustion response of an exhaust section in which the augmentor is located over a range of operating parameters in order to determine locations corresponding to those that cause thermo-acoustic coupling. Using this information, the fuel injectors and flame holders are placed to provide a beneficial phase relationship between heat release and acoustic pressure so that the engine exhibits reduced thermo-acoustic coupling at least over a selected range of operating parameters.

Figure 1:
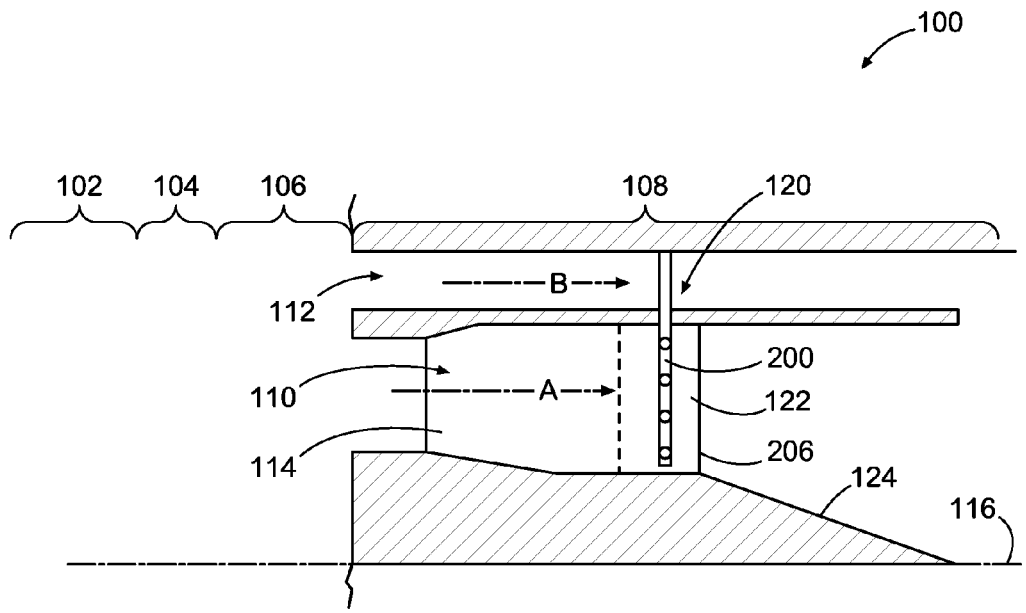
FIG. 1 is a schematic diagram depicting an exemplary embodiment of a gas turbine engine.

Reference is now made to the schematic diagram of FIG. 1, which depicts an exemplary embodiment of a gas turbine engine. Specifically, engine 100 is a turbofan that incorporates a compressor section 102, a combustion section 104, a turbine section 106 and an exhaust section 108. Although depicted as a turbofan gas turbine engine, it should be understood that the concepts described herein are not limited to use with turbofans as the teachings may be applied to other types of gas turbine engines.

As shown in the embodiment of FIG. 1, exhaust section 108 defines a core gas path 110 directing a core flow of gas (depicted by arrow A), and a fan air bypass gas path 112 directing a bypass flow of fan air (depicted by arrow B). Multiple vanes (e.g., vane 114) are positioned circumferentially about a longitudinal axis 116 of the engine, with various components of an augmentor assembly 120 being supported by the vanes. By way of example, a trailing edge box 122 (which makes up the aft section of vane 114) incorporates an assembly of components that include a fuel injector 200 for providing a spray of fuel for augmentation and a flame holder 206 for facilitating combustion of the spray of fuel. Notably, both the fuel injectors and flame holders are cooled during operation in this embodiment. A tailcone 124 also is located in the exhaust section to provide and complete the inner flow path surface.

In the embodiment of FIG. 1, the fuel injectors (e.g., fuel injector 200) and flame holders (e.g., flame holder 206) are positioned within exhaust section 108 so that heat release and acoustic pressure oscillation cycles associated with the augmentor are out of phase by between at least approximately 100 degrees and less than approximately 260 degrees (e.g., approximately 180 degrees). Notably, combustion instability in an augmentor can be represented by dynamic pressure oscillations associated with the combustion process, which can cause undesirably large acoustic noise and accelerated high cycle fatigue damage to the exhaust system components. The flame pressure oscillations can occur at various fundamental or predominant frequencies determined by the acoustic resonances in the system and higher order harmonics. The flame pressure oscillations propagate upstream toward the fuel injectors and, in turn, cause the fuel and air mixture to fluctuate in time at the resonant frequency. For example, at a specific flame pressure oscillation frequency, the pressure and velocity adjacent to the fuel injection orifices varies between high and low values. This can cause the fuel being discharged to vary in flow rate and fuel atomization from high to low values so that the resulting fuel and air mixture exhibits a fluctuating fuel and air concentration wave, which flows downstream, is ignited, and releases heat during the combustion process. As the heat release from the fuel concentration wave comes into phase with the corresponding flame pressure oscillation frequency, excitation can occur causing the pressure magnitude to increase in resonance and creating undesirably high acoustic noise and high cycle fatigue damage.

Figure 2:
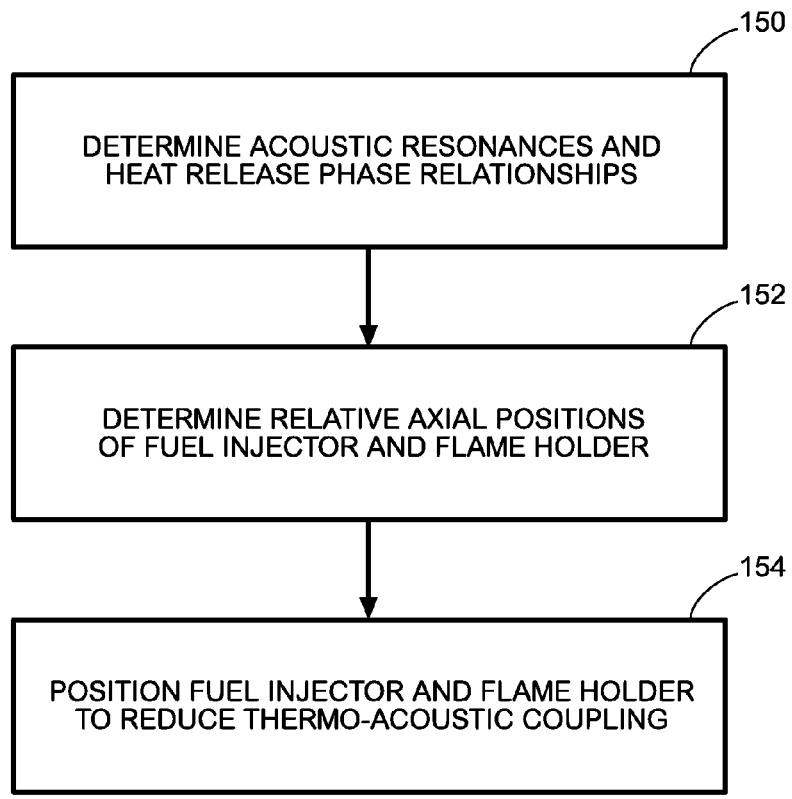
FIG. 2 is a schematic diagram depicting an exemplary method involving reduced thermo-acoustic coupling of a gas turbine engine augmentor.

FIG. 2 is a schematic diagram depicting an exemplary method involving reduced thermo-acoustic coupling of a gas turbine engine augmentor. As shown in FIG. 2, the method involves determining the acoustic resonances and phase relationships for the heat release (block 150). As shown in block 152, this information can be used to determine the relative axial positions of a fuel injector and a flame holder along an exhaust section of a gas turbine engine. In block 154, the fuel injector and the flame holder are positioned so that, during operation, thermo-acoustic coupling is reduced by creating a dynamic heat release that is approximately 180 degrees out of phase with the acoustic pressure oscillations. In some embodiments, the fuel injector and the flame holder are positioned prior to testing the engine.

In determining the relative axial positions of a fuel injector and a flame holder, the acoustic response and combustion response of the exhaust section can be modeled so that locations associated with thermo-acoustic coupling can be determined over a range of operating parameters to determine the desired positioning. Acoustic modeling of the exhaust chamber can provide the distribution of the fluctuating pressure within the chamber and variations in the phase of the pressure at the fuel injector locations. Modeling of the dynamic heat release involves knowledge of the dynamic behavior of the fuel injection system, the fuel injection and atomization processes, the fuel transport processes within the core flow of the augmentor, and the flame combustion processes. Each of these behaviors contributes to the resulting phase characteristics of the heat release, which determines the phase of the heat release relative to the acoustic pressure oscillations.

Figure 3:
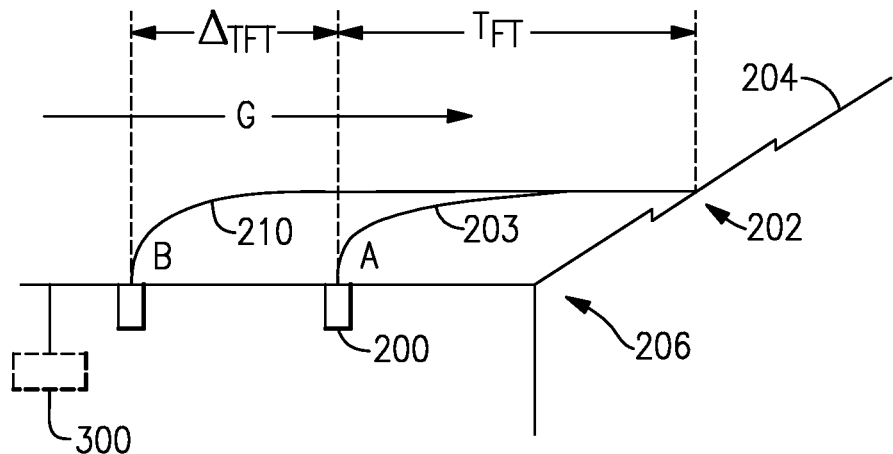
FIG. 3 is a schematic diagram depicting repositioning of a fuel injector in order to affect fuel transport time.

Notably, fuel injection in an augmentor typically utilizes pressure-atomized fuel injectors directed perpendicular to the primary core air flow stream, as depicted in FIG. 3. This fuel delivery method introduces unique phase delay behavior related to the turning and acceleration of the fuel that relates to the understanding of the heat release phase and is different than the fuel transport properties existing in other gas turbine combustion systems.

Experimental methods can also be used in determining the acoustic response and combustion response corresponding to the axial positions of a fuel injector and a flame holder to determine positions for improving the thermo-acoustic coupling. If testing with multiple fuel injector or flame holder positions or with multiple flow velocities is conducted, the dynamic response can be analyzed using the concept described here to ascertain desired fuel injector and flame holder positions, e.g., a positions that minimize the thermo-acoustic coupling.

FIG. 3 is a schematic diagram involving axial repositioning of a fuel injector. As shown in FIG. 3, fuel injector 200 is located at an axial position A within an exhaust section of a gas turbine engine. A gas path (depicted by arrow G) flows past the fuel injector and is used to transport fuel sprayed into the gas path by the fuel injector. Specifically, in this embodiment, the fuel is injected perpendicular to the gas path with the fuel traveling along a fuel transport trajectory 203 to an ignition location 202. Notably, the ignition location is defined by an intersection of the fuel and a flame sheet 204 associated with a flame holder 206.

During operation, fuel and air mix to form a fuel-air mixture that is ignited at ignition location 202 to establish flame sheet 204, which continually ignites the entering fuel-air mixture. Flame sheet 204 is excitable at various pressure oscillation frequencies including fundamental acoustic frequencies for the exhaust chamber. Any specific pressure oscillation frequency may propagate upstream to the fuel injector at a velocity generally equal to the speed of sound minus the average flow velocity of the air flowing along gas path G. When the flame pressure oscillation reaches the fuel injection orifice of the fuel injector after an upstream time delay, the pressure and velocity oscillations cause the amount of fuel discharged and distributed from the fuel injector to vary. Accordingly, the fuel-air mixture developed downstream behaves as an oscillation at the corresponding flame pressure oscillation frequency resulting in a fuel concentration wave. The wave travels downstream from the fuel injector 200 at location A and reaches flame sheet 204 after another time delay caused by the fuel traveling along the fuel trajectory 203. The fuel then undergoes mixing and combustion, which adds an additional time delay before heat is released.

Figure 4:
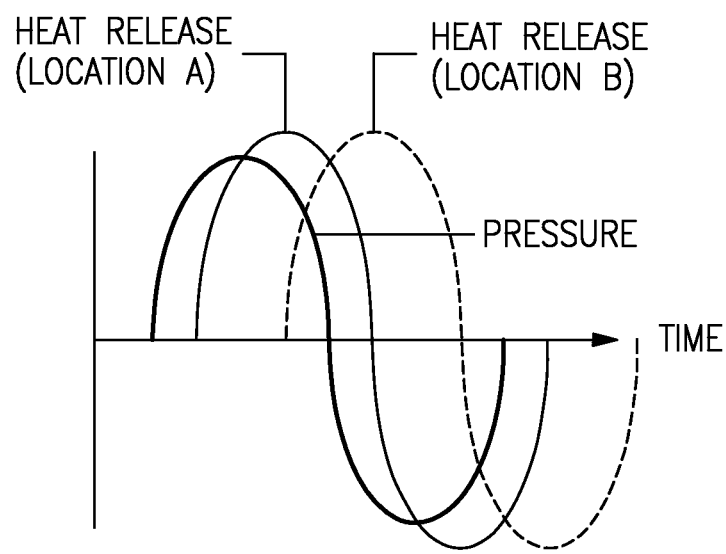
FIG. 4 is a diagram depicting the phase relationship between heat release and pressure cycles associated with the positioning of the fuel injector in FIG. 3.

As shown in FIG. 4, heat release and pressure cycles exhibited by the augmentor configuration depicted in FIG. 3 when fuel injector 200 is positioned at location A can reveal relatively close thermo-acoustic coupling, i.e., the cycles are nearly in phase (for example, phase coupling of ±45°). However, relocating fuel injector 200 to location B (FIG. 3) increases the fuel transport time delay and results in the cycles decoupling by nearly 180° (shown by the dashed heat release line in FIG. 4).

Referring once again to FIG. 3, positioning fuel injector 200 at location B increases the fuel transport time from injection to ignition (from $T_{FT}$ to $T_{FT}+\Delta T_{FT}$) as the fuel travels along fuel trajectory 210 instead of fuel trajectory 203. It should be noted that altering of the fuel trajectory can also affect the degree of atomization and vaporization of the fuel at ignition. In some embodiments, a difference in axial position of the fuel injector between location A and location B of up to several centimeters can result in an uncoupling of tens of degrees (e.g., approximately 45 degrees).

Although depicted in the embodiment of FIG. 3 as injecting fuel at an angle of approximately 90° with respect to the flow direction, various other angles of fuel injection can be used to also affect the fuel transport time and heat release phase. Notably, altering the degree of injection can influence the fuel trajectory, thereby potentially altering the degree of thermo-acoustic coupling.

In some embodiments, such as an embodiment in which multiple fuel injection locations are present (e.g., locations A & B in FIG. 3), a control system 300 can used to control the fuel delivered to each location. As such, the resultant heat release phase can be varied by varying the portion of fuel delivered to each location. In this manner, some control of the heat release phase is accomplished which can be useful in optimizing the heat release phase for different engine operating conditions.

An exemplary control system 300 can interface with electro-pneumatic valves on the various fuel circuits supplying fuel flow to multiple injector positions. The fuel transport time and portion of fuel contributing to the overall heat release and phase could be changed by altering the fuel flow. A control system 300 can schedule fuel to produce the appropriate resulting heat release phase based on knowledge of the system or by employing an active control system which senses the instability present and acts to adjust the heat release phase depending on the instability characteristics. Thus, dynamic adjustment of the phase relationship between the heat release and acoustic pressure oscillation cycles can be provided.

Various functionality, such as that described above in the flowcharts and/or with respect to control system operation, can be implemented in hardware and/or software. In this regard, a computing device can be used to implement various functionality. In terms of hardware architecture, a computing device can include a processor, memory, and one or more input and/or output (I/O) device interface(s) that are communicatively coupled via a local interface.

The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A method for varying thermo-acoustic coupling of an augmentor of a gas turbine engine, comprising:
   providing a fuel injector and a flame holder disposed along an axis;
   positioning the fuel injector in a first axial position relative to the flame holder by mounting the fuel injector in the first axial position in the augmentor;
   operating the gas turbine engine and determining an initial phase relationship between a pressure oscillation cycle of the augmentor and heat release cycle of the augmentor, wherein the initial phase relationship corresponds to the first axial position of the fuel injector relative to the flame holder;

repositioning the fuel injector to a second axial position by mounting the fuel injector in the second axial position in the augmentor, the second axial position being different than the first axial position and being relative to a flame holder of the augmentor, wherein the fuel injector is repositioned in response to the initial phase relationship, and wherein the fuel injector is repositioned to the second axial position in response to fuel delivery dynamic characteristics of the augmentor; and controlling the fuel injector with a control system.

2. The method of claim 1, wherein:
the fuel injector is one of multiple fuel injectors; and
the flame holder is one of multiple flame holders.

3. The method of claim 1, wherein positioning the fuel injector in the first axial position relative to the flame holder is in response to modeling acoustic response and combustion response of an exhaust section over a plurality of augmentor operating parameters.

4. The method of claim 3, wherein positioning the fuel injector in the first axial position relative to the flame holder is performed prior to testing the engine.

5. The method of claim 1, wherein the heat release phase is varied in response to the control system.

6. The method of claim 5, further comprising interfacing the control system with an electro-pneumatic valve to control fuel flow to the fuel injector.

7. The method of claim 2, wherein the multiple of fuel injectors are arranged at different axial locations.

8. The method of claim 1, further comprising cooling the fuel injector and the flame holder.

9. A method for varying thermo-acoustic coupling of an augmentor of a gas turbine engine, comprising:
providing a fuel injector and a flame holder disposed along an axis;
positioning the fuel injector in a first axial position relative to the flame holder by mounting the fuel injector in the first axial position in the augmentor;
operating the gas turbine engine and determining an initial phase relationship between a pressure oscillation cycle of the augmentor and heat release cycle of the augmentor, wherein the initial phase relationship corresponds to the first axial position of the fuel injector relative to the flame holder;
repositioning the fuel injector to a second axial position by mounting the fuel injector in the second axial position in the augmentor, the second axial position being different than the first axial position and being relative to the flame holder, wherein the fuel injector is repositioned in response to the initial phase relationship such that the heat release cycle and a flame pressure oscillation cycle are out of phase by at least approximately 100 degrees, the second axial position different than the first axial position; and
controlling the fuel injector with a control system.

10. The method of claim 9, wherein the initial phase relationship corresponds to the flame pressure oscillation cycle out of phase by 45 degrees or less with the heat release cycle.

11. The method of claim 9, wherein the fuel injector is axially further from the flame holder at the second axial position than at the first axial position.

12. The method of claim 9, wherein the initial phase relationship is varied in response to the control system.

13. The method of claim 1, wherein the fuel injector is a pressure-atomized fuel injector.

14. The method of claim 1, wherein the augmentor includes phase delay behavior related to the turning and acceleration of fuel in the augmentor.

15. The method of claim 1, wherein the distance between the first axial position and the second axial position is greater than 1 cm.

* * * * *